United States Patent [19]
Descat et al.

[11] Patent Number: 5,369,070
[45] Date of Patent: Nov. 29, 1994

[54] ZEOLITE Y-BASED CATALYTIC COMPOSITION WHICH CAN BE USED IN TREATING OXYGENATED EFFLUENT CONTAINING NITROGEN OXIDES, ITS PREPARATION AND PROCESS FOR USE

[75] Inventors: M. Gilles Descat, Saint Avold; M. Christian Hamon, Saint Nazaire, both of France

[73] Assignee: Elf Atochem S.A., Puteaux, France

[21] Appl. No.: 809,492

[22] PCT Filed: Jul. 10, 1990

[86] PCT No.: PCT/FR90/00519

§ 371 Date: Feb. 28, 1992

§ 102(e) Date: Feb. 28, 1992

[87] PCT Pub. No.: WO91/00773

PCT Pub. Date: Jan. 24, 1991

[30] Foreign Application Priority Data

Jul. 12, 1989 [FR] France .................. 89 09402

[51] Int. Cl.$^5$ .................................................. B01J 29/10
[52] U.S. Cl. .......................................... 502/68; 502/60; 502/79
[58] Field of Search .................. 502/79, 68, 60, 64

[56] References Cited

U.S. PATENT DOCUMENTS

| | | | |
|---|---|---|---|
| 3,013,985 | 12/1961 | Breck et al. | 502/79 |
| 3,346,328 | 10/1967 | Jergeys et al. | 502/79 |
| 3,497,462 | 2/1970 | Kruerke | 502/79 |
| 3,595,611 | 7/1971 | McDaniel et al. | 502/79 |
| 3,649,177 | 3/1972 | Rosback | 502/79 |
| 3,929,621 | 12/1975 | Lussier et al. | 502/79 |
| 4,052,337 | 10/1977 | Nishikawa et al. | 423/239 |
| 4,748,012 | 5/1988 | Weber et al. | 502/64 |
| 4,910,004 | 3/1990 | Hamon et al. | 423/239 |

FOREIGN PATENT DOCUMENTS

| | | |
|---|---|---|
| 0199169 | 10/1986 | European Pat. Off. |
| 0286507 | 10/1988 | European Pat. Off. |
| 0326667 | 8/1989 | European Pat. Off. |
| 1523017 | 4/1968 | France |
| 3802871 | 8/1987 | Germany |
| 1190942 | 5/1970 | United Kingdom |

OTHER PUBLICATIONS

Chemical Abstracts, vol. 91, 1979, p. 298, Abstract No. 128126s.

CIT, vol. 55, No. 2, 1983, pp. 148–149.

*Primary Examiner*—Carl F. Dees
*Attorney, Agent, or Firm*—Burns, Doane, Swecker & Mathis

[57] ABSTRACT

Catalytic compositions based on zeolite Y for use in the treatment of oxygenated effluents containing $NO_x$, comprising 70 to 90% of zeolite $NH_4Y$ having a specific surface between 750 and 950 m$^2$/g exchanged to cupric ions, wherein the copper content is between 2 and 12% relative to the weight of the zeolite; and 10 to 30% of a binder are disclosed. Processes for the preparation of such catalytic compositions are also disclosed.

13 Claims, No Drawings

ZEOLITE Y-BASED CATALYTIC COMPOSITION WHICH CAN BE USED IN TREATING OXYGENATED EFFLUENT CONTAINING NITROGEN OXIDES, ITS PREPARATION AND PROCESS FOR USE

The present invention concerns catalytic compositions for the selective reduction by ammonia of nitrogen oxides ($NO_2$) contained in gaseous effluents. It also concerns the preparation of these compositions and a purification process using them.

Among these processes in particular a process described in FR 2 568 789 is known; it proposes a reduction-denitrification process by ammonia of residual gases in the presence of a zeolite of a hydrogen and/or iron substitution type at a surface velocity of at least 5 m/h and with a ratio higher than 1.3 of the ammonia concentration to the nitrogen dioxide, $NO_2$, concentration.

Applicant sought to reduce the nitrogen oxides contained within a wide range of concentration in oxygenated effluents by the use of lower concentration ratios of $NH_3/NO_x$, in particular ratios of the order of 1.1, and has initially proposed catalytic compositions based on mordenite with a lower Na proportion, making it possible to obtain excellent results in the reduction by ammonia of $NO_x$ in oxygenated effluents at relatively elevated temperatures of 300° to 375° C. if the mordenite is in the ammonium form, 300° to 550° C. if in the acid form. It was later discovered that these temperatures may be considerably lowered by using as the active matter a mordenite exchanged to copper; the temperature is then of the order of 225° to 400° C. These results are complied in EP 0286507.

U.S. Pat. No. 4 052 337 describes the use of different catalysts of the zeolite type, in particular zeolite Y to reduce the $NO_x$ of $NH_3$. This catalyst is intended for use at relatively high temperatures to reduce nitrogen oxides containing sulfur, is effective only if it is prepared by a process carrying out a preliminary exchange of zeolite with alkaline earth ions followed by an impregnation by metal ions, in particular cupric ions.

The present applicant has now discovered a catalytic system obtained by an exchange reaction with cupric ions of a (end of replacement page) zeolite Y selected as a function of its specific surface and perfectly effective in the reduction of $NO_x$ nitrogen oxides with ammonia, at temperatures lowered relative to those attained with catalysts based on mordenite exchanged to copper, described in EP 0286507, specifically between 200° and 400° C.

The initial zeolite used to prepare the catalytic compositions of the present invention is a NaY zeolite with a specific surface area of 750 to 950 $m^2/g$. This zeolite has a more open structure than mordenite. It contains the largest cavities known in the structures of the so-called supercage type zeolites, with a diameter around 13 Å; these cavities communicate with each other through openings having diameters of the order of 8 to 9 Å and their succession constitutes the pores of the lattice. The structure is cubic and the pores extend in the 3 perpendicular spatial directions and intersect at the supercages.

The initial NaY zeolite used in the preparation of the catalysts according to the invention has an atomic ratio of the Si/Al skeleton of 2 to 3.

The Si and Al analyses are carried out by X ray fluorescence.

The specific surface is calculated by the BET method from the adsorption-desorption isotherm effected at the temperature of liquid temperature after a pretreatment at 500° C. under a flow of dry nitrogen.

The parameter of the crystalline lattice is generally between $24.60 \times 10^{-10}$ m and $24.75 \times 10^{-10}$ m. It is calculated from the x-ray diffraction diagram by the method described in ASTM D 3.942.80.

The present invention thus concerns novel catalytic compositions applicable to the reduction by $NH_3$ of $NO_x$ nitrogen oxides and containing as the active matter a Y zeolite obtained from a NaY zeolite with a specific surface of 750 to 950 $m^2/g$ preferably greater than 800 m/g, exchanged for cupric ions. Zeolites exchanged for cupric ions are defined in this context as both the products of a direct exchange for $Cu^{++}$ ions and the products obtained by a first exchange for $NH_4^+$ followed by an exchange for $Cu^{2+}$ ions. More particularly, the zeolite in the form exchanged for copper in the $2+$ state represents 70 to 90% by weight of the novel catalytic compositions, with the rest consisting of a binder and the copper content relative to the weight of the zeolite is advantageously 2 to 12%, preferably 5 to 11%, which represents an exchange proportion relative to the cation of 40 to 85%.

The present invention also concerns a process for the preparation of these catalytic compositions from a Y zeolite by the direct or indirect exchange of the sodium ions of the initial zeolite for $Cu^{2+}$ ions.

In an indirect exchange from a zeolite initially exchanged for ammonium, the process is as follows: the NaY zeolite is treated with an ammonium nitrate solution in an agitated reactor. The proportion of the exchange is limited by the thermodynamics and for a given systems depends on the ammonium nitrate concentration, the zeolite Y content of the suspension and the temperature. The kinetic limit is overcome by maintaining a reaction time sufficient to attain the thermodynamic equilibrium. Generally, within the temperature range applied of between 100° and 150° C., the time is set at 30 min. The obtention of low residual sodium contents implies the elimination of extracted sodium present in the solution. These exchange operations are repeated as many times as necessary by separating the partially exchanged zeolite Y by filtration, followed by the washing of the zeolite cake with demineralized water. The ammonium nitrate solutions used have $NH_4NO_3$ concentrations of 400 to 850 g/l. The reaction temperature is between 100° and 150° C. and the V/P of the volume by weight of the solids in the dry state is generally around 5. The residual sodium content depends on the number of exchange operations. For example, after 3 cycles, with a $NH_4NO_3$ concentration of 800 g/l and a temperature of 130° C., it becomes less than 1%, while initially it was around 9.5%.

The product obtained is dried at a temperature of the order of 120° for a duration of 10 to 20 h and then subjected to a mixing operation with a binder. The latter is an element of the group consisting kaolinite clay, bentonite, alumina, alone or in combination. The catalytic composition obtained is processed in a suitable form, for example pellets or preferably extrusions. This is followed by drying for several hours at a temperature of 100° to 120° C.

The specific surface measured by the BRT method is greater than 700 $m^2/g$ and the diamter of the macropores measured with a mercury porosimeter is essentially between 100 and 10,000 Å.

To prepare the catalytic compositions exchanged with copper, the process is begun either with zeolite Y in the sodium form or the zeolite exchanged with $NH_4^+$ described above and used in the powder form or in a form mentioned above.

To carry out this exchange, it has been found advantageous to use the copper in the form complexed by ammonia $(Cu(NH_3)_4)^{2+}$; this complex being obtained from an aqueous solution of copper nitrate by the addition of concentrated ammonia. The copper content exchanged is a function of the operating parameters: the $(Cu(NH_3)_4)^{2+}$ concentration, temperature, zeolite (V/P) content. Between each exchange the product is washed with demineralized water. Generally, the concentration of the complex expressed in copper is 15 to 60 g/l and preferably 20 to 30 g/l and the temperature between 20° to 80° C. and preferably 40° to 60° C. If the exchange with $Cu^{++}$ is effected with powder, it is dried after washing at 80° to 100° C., then mixed with an appropriate binder and shaped. If the exchange is carried out after forming, the preformed products are at first heat treated in a bed traversed by strong flow of dry air at 300° to 500° C., by operating in successive stages. The $Cu^{++}$ content relative to the weight of the zeolite advantageously is between 3 and 12% and preferably between 5 and 11%, which represents an exchange proportion with respect to this cation of 40 and 85%. After washing, the products are dried on plates at a temperature between 80° and 100° C. for 12 to 24 h.

The invention also concerns a process for the treatment of oxygenated effluents containing $NO_x$, using the catalytic compositions of the present invention.

The catalytic compositions are used in a flushed fixed bed reactor. Prior to injecting the reaction mixture containing $NO_x$ and $NH_3$, the products are subjected to an in situ treatment under a strong flow of dry air, minimum of 1 to 2 $Nm^3 h^{-1}/l$ of the catalyst with a gradual increase in temperature from 50° to 100° C. to a temperature of between 350° and 450° C. and maintaining this temperature range for 5 to 10 h.

The catalytic compositions are applicable to the purification in the presence of ammonia of oxygenated effluents containing nitrogen oxides ($NO_x$) at a temperature between 200° and 400° C., under a absolute pressure of at least 0.1 MPa, with an hourly flow rate of the gases (VVH) that may be very high and may attain 80,000 $h^{-1}$, and a ratio of the ammonia concentration to the nitrogen oxide concentration, $NH_3/NO_x$ of maximum 1.25.

Exceptional yields are obtained in this type of purification with molar $NH_3/NO_x$ ratios between 1.05 and 1.2; a ratio of 1.15 may be chosen advantageously.

The effect of pressure is comparable to that observed with catalysts based on mordenite in the ammonium form, exchanged or not with $Cu^{++}$ and described in BP 0286507. An increase in pressure is thus favorable. The advantage of the catalytic compositions according to the invention consists of the conduct of the purification operation at low temperatures.

Very satisfactory results are obtained at 220° C.

The catalytic compositions exchanged with copper make it possible to combine very high purification yields of 98% with quantities of ammonia very close to stoichiometry and particularly with very low residual ammonia contents after the reaction, which is an undeniable advantage for this type of catalyst.

The purification process carried out with catalytic compositions according to the invention are especially suitable for the purification of tail gases released to the atmosphere in the production of nitric acid.

The process is extremely flexible, suitable for the purification of gaseous effluents with any nitrogen oxide content. The efficacity of the process is remarkable even in the case of high $NO_x$ contents of the order of 20,000 ppm and also with low contents of the order of 100 ppm of nitrogen oxides.

These catalytic compositions are stable industrial products experiencing no mechanical deterioration or loss of activity over very long periods of operation.

The following examples illustrate in a nonlimiting fashion the preparation of the catalytic compositions according to the invention and their application. All quantities are expressed in parts by weight.

EXAMPLE 1: Preparation of a zeolite exchanged with $NH_4U$-

25 parts of Zeolite Nay in powder form. The atomic Si/Sl ration is 2.6 and the sodium content in the dry product is 9.7%. The heating loss at 1000° C. is 18%. The specific surface is 830 $m^2/g$ and the crystalline parameter is 24.63 Å.

The average diameter of the particles is 3 microns.

Several successive exchanges of $Na^+$ ions with $NH_4$ ions are carried out in a closed reactor.

The zeolite is suspended in an ammonium nitrate solution containing 800 g/l $NH_4NO_3$. The control point is set at 130° C. and the stage is maintained at this level for 30 min.

The suspension is then transferred to a filter. The zeolite cake obtained is washed in percolation with 120 parts of demineralized water at 80° C.

The exchange is repeated several times. At the completion of this operation, the product is dried in a current of hot air.

The heating loss (PAF) is then 25%. The residual sodium content in the dry product is 0.8%, signifying a proportion of the exchange of $Na^+$ with $NH_4^+$ of 92%.

12 parts of this zeolite, the dry equivalent of 9 parts, are mixed intimately in a mixer with 2.7 parts of kaolinite clay having a PAF of 17%. After humidity adjustment, the mixture obtained is extruded through a die. The extrudates, which have diameter of 3 mm, are then dried and calcined at a temperature of 300° to 400° C. to increase their mechanical strength.

These extrudates, the binder content of which in the dry product is 20%, serve as the base for the preparation of the catalysts described in Examples 2 and 3.

EXAMPLE 2: Preparation of a zeolite exchanged with copper from a zeolite previously exchanged with $NH_4^+$ The extrudates, the preparation of which is described in Example 1, are placed in a stainless steel basket.

A copper-tetramine solution is prepared by adding a concentrated ammonia solution to a copper nitrate salt. Initially, a copper hydroxide precipitate is formed, which disappears in an excess of the ammonia solution. The blue, clear solution is diluted by the addition of demineralized water.

The stainless steel basket with the extrudate is placed into a receptacle.

The copper solution is poured in until its level exceeds that of the extrudates. The mixture is heated to 60° C. and the exchange reaction is maintained for 1 h.

The basket is then removed; the extrudates are washed by immersion in demineralized water and the operation is repeated several times with fresh copper solutions. The product is then washed several times by immersion and then dried. The heating loss is 22%.

The copper content of the extrudates is 8.5% (in the dry product), which represents, in view of a binder content of 20%, a proportion of the ammonium and/or residual sodium ions exchanged with $Cu^{++}$ of 80%.

EXAMPLE 3: The preparation of Example 2 is repeated by carrying out only one exchange with the tetramine copper solution. The copper content in the dry product is 2.3%, which corresponds an exchange proportion for $Cu^{++}$ of 22%. The residual sodium content is 0.4%.

EXAMPLE 4: Preparation of a catalytic composition by the direct exchange of the initial zeolite The NaY zeolite used in the preparation of the catalysts of Examples 1, 2 and 3 is employed.

This zeolite is processed according to methods of the state of the art with 20% of a binder of the kaolinite clay type. The extrudates have a diameter of 1.8 mm.

After drying, the extrusions are calcined then exchanged in a solution of copper tetramine at a temperature of 60° C. for 2 h. The latter solution has been prepared from 25 g copper nitrate, $Cu(NO_3)_2$, $6\ H_2O$, dissolved in 100 cm$^3$ demineralized water and 100 cm$^3$ concentrated ammonia.

After washing by immersion, the extrudates are dried.

The copper content in the dry product (1000° C.) is 7%, which in view of the binder content of 20%, represents a proportion of the exchange of sodium for copper of 67%. The residual sodium content is 3%.

EXAMPLE 5: This example illustrates the application of the catalysts prepared by the processes described in the preceding examples, in a fixed bed catalytic test unit, under different conditions, in the reduction of nitrogen oxides by ammonia using the tail gases of an industrial nitric acid unit.

The volume of the catalyst used is 37.5 cm$^1$, it is heated to 350° C. under a gaseous flow high in nitrogen (96% $N_2$- 4% $O_2$) of 750 Nl/h. at a rate of 100° C./h. The ($N_2$- $O_2$) mixture is then replaced by the effluent to be treated, which is mixed with a quantity of ammonia as a function of the nitrogen oxide content.

The reduction process is carried out at a pressure of 0.104 to 0.45 MPa, absolute. The hourly volume flow velocity (VVH) expresses the flow of gases entering onto the catalyst in Nl/h divided by the volume of the catalyst. The $NO_x$ content is expressed in ppmv (parts per million by volume). It is 1500 ppmv in all of the tests carried out. The quantity of ammonia adjusted to the gases entering is expressed by the molar $NH_3/NO_x$ ratio, which is around 1.16.

The residual ammonia content after the reaction is expressed in ppmv. The temperature indicated is the average temperature of the catalytic bed. The yield of the reduction expressed in % corresponds to the ratio of the difference between the $NO_x$ content of the gases entering and the $NO_x$ content of the gases exiting, to the $NO_x$ content of the gases entering.

The results obtained with the catalysts obtained in the examples are compiled respectively in Table I and II for Example 2, III for Example 3, IV for Example 4.

TABLE I

| Average temperature of the bed (°C.) | Absolute Pressure (MPa) | VVH (h$^{-1}$) | Purification Yield (%) | $NH_3$ in output (ppmv) |
| --- | --- | --- | --- | --- |
| 350 | 0.104 | 10000 | 99.2 | 0 |
| 350 | 0.104 | 20000 | 98.9 | 0 |
| 350 | 0.104 | 30000 | 98.7 | 0 |
| 250 | 0.104 | 10000 | 99.1 | 0 |
| 250 | 0.104 | 20000 | 96.3 | 0 |
| 250 | 0.104 | 30000 | 94.5 | 0 |
| 220 | 0.104 | 10000 | 98.9 | 0 |
| 220 | 0.104 | 20000 | 94.5 | 0 |
| 220 | 0.104 | 30000 | 85.4 | 0 |
| 200 | 0.104 | 10000 | 96.5 | 0 |
| 200 | 0.104 | 20000 | 91.8 | 0 |

TABLE II

| Average temperature of the bed (°C.) | Absolute Pressure (MPa) | VVH (h$^{-1}$) | Purification Yield (%) | $NH_3$ in output (ppmv) |
| --- | --- | --- | --- | --- |
| 250 | 0.3 | 20000 | 98.4 | 0 |
| 250 | 0.3 | 30000 | 98.3 | 0 |
| 250 | 0.3 | 40000 | 97.7 | 0 |
| 250 | 0.3 | 50000 | 96 | 0 |
| 200 | 0.3 | 10000 | 98.9 | 0 |
| 200 | 0.3 | 20000 | 97.8 | 0 |
| 200 | 0.3 | 30000 | 93.4 | 0 |

TABLE III

| Average temperature of the bed (°C.) | Absolute Pressure (MPa) | VVH (h$^{-1}$) | Purification Yield (%) | $NH_3$ in output (ppmv) |
| --- | --- | --- | --- | --- |
| 270 | 0.104 | 20000 | 99.8 | 0 |
| 270 | 0.104 | 30000 | 88.3 | 0 |
| 320 | 0.104 | 20000 | 98.7 | 0 |
| 350 | 0.104 | 20000 | 90 | 0 |
| 350 | 0.104 | 30000 | 84.7 | 0 |

TABLE IV

| Average temperature of the bed (°C.) | Absolute Pressure (MPa) | VVH (h$^{-1}$) | Purification Yield (%) | $NH_3$ in output (ppmv) |
| --- | --- | --- | --- | --- |
| 220 | 0.104 | 100000 | 98 | 0 |
| 220 | 0.104 | 20000 | 94.8 | 0 |
| 250 | 0.104 | 10000 | 98.8 | 0 |
| 250 | 0.104 | 20000 | 97.6 | 0 |
| 300 | 0.104 | 10000 | 0.68 | 0 |
| 300 | 0.104 | 20000 | 96 | 0 |
| 220 | 0.45 | 20000 | 99 | 0 |
| 220 | 0.45 | 40000 | 97.4 | 0 |
| 300 | 0.45 | 20000 | 99.5 | 0 |
| 300 | 0.45 | 40000 | 96.5 | 0 |
| 300 | 0.45 | 60000 | 94 | 0 |

We claim:

1. A catalytic composition comprising 70 to 90% of zeolite $NH_4Y$ having a specific surface between 750 and 950 m$^2$/g exchanged to cupric ions, wherein the copper content is between 2 and 12% relative to the weight of the zeolite; and 10 to 30% of a binder.

2. The catalytic composition according to claim 1, wherein the copper content is between 2 and 8.5% relative to the weight of the zeolite.

3. The catalytic composition according to claim 1 or 2, wherein the specific surface of the zeolite NH$_4$Y is greater than 800 m$^2$/g.

4. A process for preparing a composition according to claim 1 or 2, wherein a NaY zeolite is first exchanged to NH$_4^+$ and is then exchanged in successive exchanges to cupric ions.

5. A process for preparing a composition according to claim 3, wherein a NaY zeolite is first exchanged to NH$_4^+$ and is then exchanged in successive exchanges to cupric ions.

6. The process for preparing a composition according to claim 4, wherein the cupric ion exchange employs a cupric solution comprising a (Cu(NH$_3$)$_4$)$^{2+}$ complex.

7. The process for preparing a composition according to claim 5, wherein the cupric ion exchange employs a cupric solution comprising a (Cu(NH$_3$)$_4$)$^{2+}$ complex.

8. The process for preparing a composition according to claim 4, wherein the zeolite exchanged to cupric ions is subsequently dried and then shaped.

9. The process for preparing a composition according to claim 5, wherein the zeolite exchanged to cupric ions is subsequently dried and then shaped.

10. The process for preparing a composition according to claim 6, wherein the zeolite exchanged to cupric ions is subsequently dried and then shaped.

11. The process for preparing a composition according to claim 7, wherein the zeolite exchanged to cupric ions is subsequently dried and then shaped.

12. A process for preparing a composition according to claim 1 or 2, wherein the zeolite is first shaped and then exchanged, and wherein the cupric solution comprises a (Cu(NH$_3$)$_4$)$^{2+}$ complex.

13. A process for preparing a composition according to claim 3, wherein the zeolite is first shaped and then exchanged, and wherein the cupric solution comprises a (Cu(NH$_3$)$_4$)$^{2+}$ complex.

* * * * *